United States Patent
Knight et al.

(10) Patent No.: US 10,494,105 B2
(45) Date of Patent: Dec. 3, 2019

(54) CABIN BLOWER SYSTEM

(71) Applicant: ROLLS-ROYCE PLC, London (GB)

(72) Inventors: Glenn A Knight, Belper (GB); Alan R Maguire, Derby (GB); Richard Sharpe, Leek (GB)

(73) Assignee: ROLLS-ROYCE plc, London (GB)

( * ) Notice: Subject to any disclaimer, the term of this patent is extended or adjusted under 35 U.S.C. 154(b) by 221 days.

(21) Appl. No.: 15/415,568

(22) Filed: Jan. 25, 2017

(65) Prior Publication Data
US 2017/0233080 A1    Aug. 17, 2017

(30) Foreign Application Priority Data

Feb. 16, 2016  (GB) .................................. 1602710.4

(51) Int. Cl.
*B64D 13/00* (2006.01)
*F01D 13/00* (2006.01)
(Continued)

(52) U.S. Cl.
CPC ............ *B64D 13/00* (2013.01); *F01D 13/00* (2013.01); *F01D 17/16* (2013.01); *F02C 7/277* (2013.01);
(Continued)

(58) Field of Classification Search
CPC .................... B64D 13/00; B64D 13/04; B64D 2013/0696; F01D 13/00; F01D 17/16;
(Continued)

(56) References Cited

U.S. PATENT DOCUMENTS 2,539,430 A    1/1951   Jepson et al.
3,786,696 A    1/1974   Aleem
(Continued)

FOREIGN PATENT DOCUMENTS

EP    2735507 A1    5/2014
EP    3 034 405 A1   6/2016
(Continued)

OTHER PUBLICATIONS

Jul. 21, 2017 Extended European Search Report issued in Patent Application No. 17153055.3.
(Continued)

*Primary Examiner* — Charles G Freay
(74) *Attorney, Agent, or Firm* — Oliff PLC

(57) ABSTRACT

An aircraft cabin blower system is described having a hydraulic circuit comprising a first hydraulic device and a second hydraulic device. The first hydraulic device is mechanically coupled to a cabin blower compressor and the second hydraulic device is arranged in use to be mechanically coupled to a spool of a gas turbine engine. The first hydraulic device is capable of performing as a hydraulic motor and the second hydraulic device is capable of performing as a hydraulic pump. When, in use, the system is operating in a cabin blower configuration, a driving force supplied by the spool of the gas turbine causes the second hydraulic device to pump liquid provided in the hydraulic circuit and thereby to drive the first hydraulic device, which in turn rotates the cabin blower compressor.

14 Claims, 1 Drawing Sheet

(51) Int. Cl.
*F01D 17/16* (2006.01)
*F02C 7/277* (2006.01)
*F02C 7/32* (2006.01)

(52) U.S. Cl.
CPC .......... *F02C 7/32* (2013.01); *F05D 2220/323* (2013.01); *F05D 2260/406* (2013.01); *F05D 2260/85* (2013.01)

(58) Field of Classification Search
CPC .... F02C 7/32; F02C 7/26; F02C 7/277; Y02T 50/671; Y02T 50/44; F05D 2220/323; F05D 2260/406; F05D 2260/85
See application file for complete search history.

(56) References Cited

U.S. PATENT DOCUMENTS

| | | | |
|---|---|---|---|
| 3,965,673 A | 6/1976 | Friedrich | |
| 5,039,281 A | 8/1991 | Johnston | |
| 5,136,837 A | 8/1992 | Davison | |
| 5,143,329 A | 9/1992 | Coffinberry | |
| 9,470,153 B2 * | 10/2016 | Suciu | F02C 7/14 |
| 2006/0032234 A1 | 2/2006 | Thompson | |
| 2011/0014062 A1 * | 1/2011 | Imaizumi | E02F 9/00 |
| | | | 417/46 |
| 2013/0199201 A1 | 8/2013 | Barkowsky et al. | |
| 2013/0202452 A1 * | 8/2013 | Schuette | F01P 7/044 |
| | | | 417/46 |
| 2013/0296091 A1 * | 11/2013 | Lemmers, Jr. | F16H 47/04 |
| | | | 475/84 |
| 2016/0167789 A1 | 6/2016 | Knight et al. | |
| 2016/0369705 A1 * | 12/2016 | Mackin | F02C 6/08 |

FOREIGN PATENT DOCUMENTS

| | | |
|---|---|---|
| EP | 3096023 A1 | 11/2016 |
| GB | 595254 A | 12/1947 |
| GB | 1017562 A | 1/1966 |
| WO | 2012/045864 A1 | 4/2012 |

OTHER PUBLICATIONS

Jul. 13, 2016 European Search Report issued in Patent Application No. GB1602710.4.

* cited by examiner

CABIN BLOWER SYSTEM

The present disclosure concerns cabin blower systems. More specifically the disclosure concerns cabin blower systems utilising hydraulic transmissions, as well as aircraft having cabin blower systems and methods of operating cabin blower systems.

Cabin blower systems are used to pressurise the cabins of aircraft. Cabin blowers are typically driven by one or more associated gas turbine engines of the aircraft. The gas turbine engine may be used to drive a cabin blower compressor in a number of ways (e.g. using electrical power generated by the engine or mechanically). Where mechanical driving of the compressor is employed, drive is typically taken from a shaft of the gas turbine engine via an accessory gearbox. A means of varying the speed of the drive delivered to the compressor is also required; it is not desirable for the cabin air flow and pressure to be determined by the particular operating point of the gas turbine at any particular moment. Therefore a gearing mechanism such as a continuously variable transmission is also provided in the drive path between the accessory gearbox and compressor. This system ensures that regardless of engine operating point and ambient air pressure the cabin flow and pressure can be maintained within acceptable limits.

Mechanical driving of the compressor may in some circumstances be undesirable because it may introduce particular architectural constraints. In particular the locations at which drive can be taken from the engine are limited. An electrical alternative may solve this problem, but electrical drive is relatively inefficient by comparison.

According to a first aspect of the invention there is provided an aircraft cabin blower system having a hydraulic circuit comprising a first hydraulic device and a second hydraulic device, wherein the first hydraulic device is mechanically coupled to a cabin blower compressor and the second hydraulic device is arranged in use to be mechanically coupled to a spool of a gas turbine engine and where further the first hydraulic device is capable of performing as a hydraulic motor and the second hydraulic device is capable of performing as a hydraulic pump, such that when, in use, the system is operating in a cabin blower configuration, a driving force supplied by the spool of the gas turbine causes the second hydraulic device to pump liquid provided in the hydraulic circuit and thereby to drive the first hydraulic device, which in turn rotates the cabin blower compressor.

The hydrostatic transmission for powering rotation of a cabin blower compressor as provided by the first aspect may be relatively lightweight, low cost and low complexity by comparison with alternative systems (e.g. those utilising a continuously variable transmission). As described further below, the system may also lend itself to a reverse configuration in which the cabin blower compressor can be used as a turbine to drive rotation of the gas turbine engine spool during a start procedure for the gas turbine engine.

In some embodiments the first hydraulic device is capable of performing as a hydraulic pump and the second hydraulic device is capable of performing as a hydraulic motor such that when, in use, the system is operating in an engine start configuration, a driving force supplied by the cabin blower compressor acting as a turbine causes the first hydraulic device to pump the liquid provided in the hydraulic circuit and thereby to drive the second hydraulic device, which in turn rotates the spool of the gas turbine engine. By using the same components of the system to provide for engine start functionality (be it ground start or in flight windmill relight), the need for at least some elements of a separate engine start system may be avoided, potentially thereby reducing cost, weight and physical space requirements.

In some embodiments the hydraulic circuit comprises a valve assembly actuatable between a first position when the system is in the cabin blower configuration and a second position when the system is in the engine start configuration, whereby the first and second positions give rise to different porting of liquid in the hydraulic circuit such that the flow direction through the second hydraulic device is the same regardless of whether the system is operating in the cabin blower configuration or the engine start configuration and such that the flow direction through the first hydraulic device reverses in dependence upon whether the system is operating in the cabin blower configuration or the engine start configuration.

Assuming that the cabin blower compressor is driven in the opposite rotational direction when it is acting as a turbine by comparison with its rotational direction when acting as a compressor, it is necessary to provide a correction for this change in direction if the spool of the gas turbine engine is not to be rotated opposite to its normal rotational direction during engine running. The re-porting of the liquid in the hydraulic circuit may provide this correction. Thus whilst the flow direction through the first hydraulic device varies corresponding to the rotation direction of the cabin blower compressor (opposite directions depending on whether it is behaving as a compressor or a turbine), the flow direction through the second hydraulic device remains consistent (corresponding to the desired consistent direction of engine spool rotation).

The porting provided by the valve assembly may be such that in one of the system configurations the liquid flows in a loop around the hydraulic circuit and in the other configuration it flows in a figure of eight. Specifically in one of the configurations an inlet port of the second hydraulic device may be connected by the valve assembly with a first port of the first hydraulic device and an outlet port of the second hydraulic device connected with a second port of the first hydraulic device. Then in the other configuration the inlet port would be connected by the valve assembly with the second port and the outlet port would be connected with the first port. Such a valve assembly, especially if it is electronically controlled may provide a lightweight and space efficient means of permitting reversible configurations whilst still permitting the gas turbine engine spool to rotate in the same direction regardless of the configuration.

In some embodiments at least one of the valve assembly, the first hydraulic device and the second hydraulic device is controllable to vary the liquid flow rate around the hydraulic circuit. As will be appreciated it may be that a different component or components (valve assembly, first hydraulic device, second hydraulic device) are controllable to alter the flow rate in dependence upon whether the system is operating in the cabin blower configuration or the engine start configuration. It may be for instance that in the cabin blower configuration the second hydraulic device is controllable to alter the flow rate and thereby the rotation rate of the cabin blower compressor, whilst in the engine start configuration it is the first hydraulic device that is controllable, thus altering the rotation rate of the engine spool. By way of alternative example it may be that the valve assembly is controllable to alter the flow rate in both the cabin blower and engine start configurations. Where control over the flow rate is provided by the first and/or second hydraulic device this may be facilitated by the relevant device(s) being of variable displacement.

In some embodiments the system comprises a processor arranged to control actuation of the valve assembly. The processor may also be arranged to control flow rate variation functionality of the valve assembly and/or the first hydraulic device and/or the second hydraulic device where that functionality is provided. The processor may for instance be an engine electronic control (EEC).

In some embodiments an array of variable exit guide vanes is provided adjacent the cabin blower compressor in the same flow path, the array being provided downstream of the cabin blower compressor in the sense of a gas flow flowing through the flow path when the system is operated in the cabin blower configuration. The variable exit guide vanes may enhance stable operation of the cabin blower compressor over a desired flow rate range when the system is operated in the cabin blower configuration. Furthermore the variable exit guide vanes may also be beneficial to condition gas entering the cabin blower compressor when it is serving as a turbine in the system's engine start configuration. Specifically by tuning the gas flow, the variable exit guide vanes may increase efficiency and/or pressure ratio delivered by the cabin blower compressor when operating as a turbine.

The variable exit guide vanes may be arranged such that they are capable of directing gas driving the cabin blower compressor such that it rotates in the same direction regardless of whether it is serving as a compressor or as a turbine. In this case it is not necessary for the valve assembly to alter the porting of the liquid in the hydraulic circuit in response to an operation change of the system from one of the cabin blower configuration and the engine start configuration to the other. The valve assembly may therefore be omitted completely or else the valve assembly may still be provided simply in order to vary the liquid flow rate.

In some embodiments an array of variable inlet guide vanes is provided adjacent the cabin blower compressor in the same flow path, the array being provided upstream of the cabin blower compressor in the sense of a gas flow flowing through the flow path when the system is operated in the cabin blower configuration. The variable exit guide vanes may be beneficial to condition gas entering the cabin blower compressor when the system is operating in the cabin blower configuration. Specifically by tuning the gas flow, the variable inlet guide vanes may increase efficiency and/or pressure ratio delivered by the cabin blower compressor. Furthermore the variable inlet guide vanes may also enhance stable operation of the cabin blower compressor over a desired flow rate range when the system is operated in the engine start configuration and the cabin blower compressor is serving as a turbine.

Actuation of the variable exit guide vanes and/or variable inlet guide vanes may be controlled by a processor such as the EEC.

In some embodiments at least one of the first and second hydraulic devices is of variable displacement. Variability in the displacement may be provided by various means. The relevant device may for example be an displacement pump/motor (optionally axial) with piston travel for any given pump/motor cycle variably controllable by an adjustable swashplate. Alternatively the relevant device may be a digital displacement device (i.e. pump/motor), having pistons that are rapidly selectively switchable between various states (e.g. pumping/motoring/idling) using digital control (e.g. rapidly switching electronically controlled valves control the state of the piston on a cycle by cycle basis). By selecting the state of each and/or banks of pistons the displacement of the pump/motor may be altered. The digital displacement device may be radial. A dedicated electronic controller may be provided for control of the valves.

In some embodiments the system comprises a cabin blower gearbox via which the mechanical coupling between the first hydraulic device and the cabin blower compressor is made. The cabin blower gearbox may be a convenient way of accommodating a desired speed difference between the first hydraulic device and the cabin blower compressor.

In some embodiments the cabin blower gearbox is a continuously variable transmission. This may allow variable control over the rate of rotation of the cabin blower compressor when the system is in the cabin blower configuration and over the rate of rotation of the gas turbine engine spool when the system is in the engine start configuration. In this way the gearbox may negate the need for or supplement any variable liquid flow rate control provided by the valve assembly, first hydraulic device and/or second hydraulic device. As will be appreciated however the cabin blower transmission could take an alternative form such as an epicyclic gearbox or a sequential shifting gearbox. In the case of an epicyclic gearbox braked rings may be provided which may provide ratio changes and/or direction reversal.

In some embodiments the second hydraulic device is arranged in use to be mechanically coupled to an accessory gearbox of the gas turbine engine via which the mechanical coupling to the spool of the gas turbine engine is made.

In some embodiments the spool of the gas turbine engine is a low pressure spool. In other embodiments however the spool may be a high pressure spool or an intermediate pressure spool.

In some embodiments the system is selectively couplable in a driving relationship to a high pressure spool of the gas turbine engine so as to be engaged when the system is in the engine start configuration. The driving connection between the system and the high pressure spool may for instance occur via the first or second hydraulic device, the accessory gearbox or the cabin blower gearbox. The selective coupling may be achieved via a clutch which may be mechanical (e.g. friction plate, dog tooth or sprag) or fluidic (switchable torque converter). Actuation of the clutch may be controlled by the EEC.

It may be necessary to drive the high pressure spool in order to achieve sufficient air flow for engine light (be it a ground start or for windmill re-light during flight). Thus where the second hydraulic device is coupled to the low pressure spool, it may be desirable to provide the coupling described in order that the high pressure spool is also driven when the system is operated in the engine start configuration. As will be appreciated rotation of the high pressure spool in the desired direction when the system is operating in the engine start configuration can be achieved by appropriate gearing. Equally it may be desirable to disengage the high pressure spool from the system when operated in the cabin blower configuration in order that it is not necessary to provide additional components (e.g. gearing or a continuously variable transmission) to overcome potential problems such as a fixed speed relationship between the low and high pressure spools dictated by the system and inconsistent rotational direction of the high pressure spool.

In some embodiments the hydraulic circuit comprises a hydraulic accumulator. The accumulator may serve to reduce fluctuations in liquid pressure in the hydraulic circuit caused by pumping and/or gas turbine engine operation transients and may also allow for a reduction in capacity (and therefore size and weight) of the first and/or second hydraulic devices. Energy stored in the accumulator may also be used for rotation of the gas turbine engine spool when the engine is shut down. This may provide increased cooling after shut down and a consequent reduction in large thermal gradients which might otherwise cause distortion of the casing and shafts and associated problems on restart e.g. lining rub events. Additional or alternative uses of the energy stored by the accumulator may include maintaining cabin blower functionality even where one, some or all engines have failed, and/or, where the hydraulic circuit forms part of a larger aircraft hydraulic circuit, continued functionality of hydraulically powered aircraft systems such as landing gear, flaps and/or control surfaces.

In some embodiments the hydraulic circuit comprises a heat exchanger arranged in use to cool the liquid in the hydraulic circuit. It may be for instance that the heat exchanger is arranged in use to utilise on rushing gas in a bypass duct of the gas turbine engine to cool the liquid in the hydraulic circuit.

In some embodiments the liquid in the hydraulic circuit is hydraulic fluid.

In some embodiments, in use of the system operating in the cabin blower configuration, the cabin blower compressor pumps air taken from a bypass duct of the gas turbine engine. A scoop may for example be provided adjacent a wall of the bypass duct and a conduit provided for delivering air from the scoop to the compressor. A further conduit may also be provided for delivering air from the compressor to one or more cabin air conditioning outlets. Air drawn from the bypass duct may be relatively free of gases and fumes that may be present elsewhere in the gas turbine engine.

In some embodiments, in use of the system operating in the engine start configuration, the cabin blower compressor is driven by an external gas supply, the cabin blower compressor thereby acting as a turbine. The external gas supply may be provided via a dedicated conduit and the cabin air conditioning outlets isolated by one or more valve assemblies during operation of the system in the engine start configuration. Conversely the dedicated conduit for supplying externally sourced gas may be isolated during operation of the system in the cabin blower configuration to prevent losses there through. The external air supply might be provided from a ground based compressed air rig or similar for ground engine start. Additionally or alternatively (especially in the case of windmill re-light) the external air supply might be provided from another engine (i.e. cross-flow via a suitable bleed of a running engine and delivered via a conduit provided), or from an alternative on aircraft source (e.g. from an aircraft auxiliary power unit or the aircraft cabin).

In some embodiments the system comprises at least one further example of the hydraulic circuit described. The hydraulic circuits may be in fluid communication therebetween such that if in use at least one of the gas turbine engines is shut down and at least one continues to run, all cabin blower compressors are rotatable as a consequence of pumping provided by the at least one gas turbine engine that continues to run. As will be appreciated it may be desirable/necessary in such circumstances to bypass any second hydraulic device mechanically coupled to an engine that has been shut down. A bypass conduit and bypass valve assembly may be provided in each hydraulic circuit for this purpose. The communication valve and/or bypass valve assembly may be actuatable by the EEC. As will be appreciated, the fluid communication described may also allow pumping from one hydraulic circuit associated with a running engine and operating in the cabin blower configuration, to deliver drive to one or more spools of another, shut-down engine via its own hydraulic circuit, in order to facilitate start of that engine.

According to a second aspect there is provided an aircraft comprising a cabin blower compressor system in accordance with the first aspect.

In some embodiments the aircraft comprises a gas turbine engine comprising a spool to which a second hydraulic device of the system is mechanically coupled.

In some embodiments the gas turbine engine further comprises an accessory gearbox via which the mechanical coupling between the second hydraulic device and the spool occurs.

In some embodiments the hydraulic circuit is part of and is in fluid communication with a broader aircraft hydraulic circuit comprising additional hydraulically controlled components. Such components may for example include landing gear, brakes, flaps and aircraft control surfaces. This may give improved redundancy and/or functionality through integration of various hydraulic circuits and systems. By way of example it may be that the second hydraulic device is an aircraft hydraulic pump that may not be dedicated to supplying drive to the cabin blower compressor and/or may not be associated with a specific engine. In this case it may be that any one of a number of cabin blower compressors provided can be rotated using hydraulic fluid pumped by the aircraft hydraulic pump. Further as long as adequate pressure is maintained within the broad aircraft hydraulic system by an operable pump or pumps, functionality of hydraulically controlled components (such as the cabin blower(s)) may be continued even in the event of failure of one or more other pumps.

might have one or more of its spools rotated for engine start (in-flight or otherwise) using hydraulic fluid from the aircraft hydraulic pump, which may have greater displacement than a dedicated cabin blower pump would have. iven by Alternatively the hydraulic circuit may be an isolated separate system with respect to one or more additional aircraft hydraulic circuits comprising additional hydraulically controlled components. As will be appreciated these one or more additional aircraft hydraulic circuits may each comprise a hydraulic pump mechanically coupled and driven in use by a spool of the gas turbine engine via the accessory gearbox.

According to a third aspect of the invention there is provided a method of operating a cabin blower system to supply gas to an aircraft cabin comprising using drive provided by a gas turbine engine to pump a liquid and using the liquid flow to drive rotation of a cabin blower compressor.

According to a fourth aspect of the invention there is provided a method of operating a cabin blower system to rotate a spool of a gas turbine engine during start of the gas turbine engine comprising using drive provided by a cabin blower compressor acting as a turbine to pump a liquid and using the liquid flow to drive rotation of the spool.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
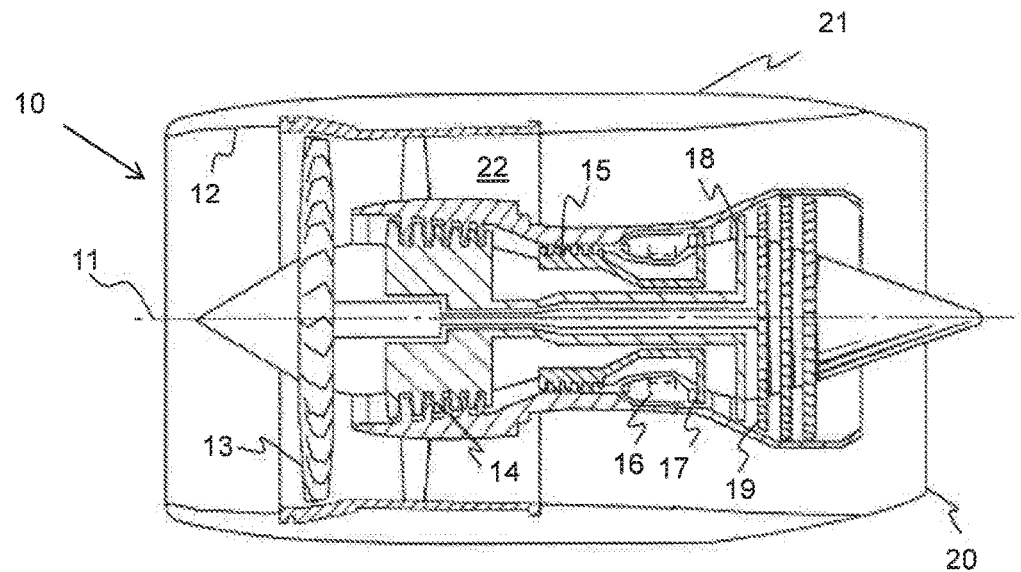
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
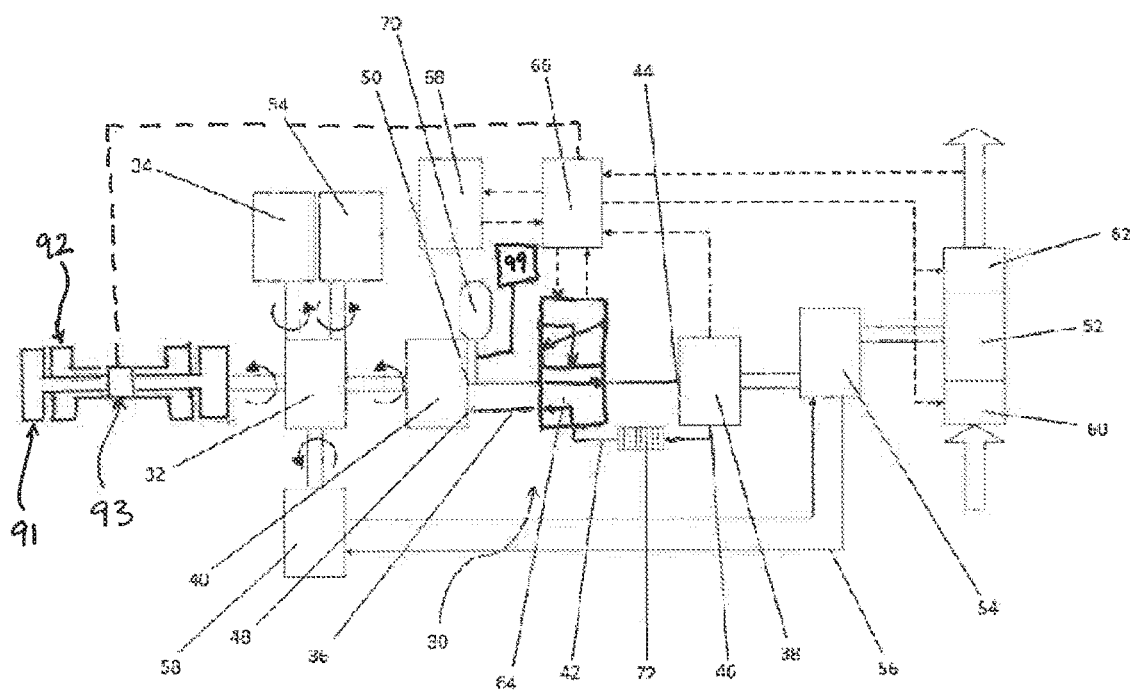
FIG. 2 is a schematic depiction of an aircraft cabin blower system in accordance with an embodiment of the invention.

Referring now to FIG. 2, an aircraft cabin blower system is generally provided at 30. In use the cabin blower system 30 is associated with a gas turbine engine (which may be similar to that described with reference to FIG. 1) of an aircraft (not shown). The gas turbine engine has a low pressure spool 91 and a high pressure spool 92. The low pressure spool drives an engine accessory gearbox 32, which is used to deliver drive from the low pressure spool to various engine and aircraft systems. One way in which drive is delivered is via hydraulics. In the embodiment of FIG. 2, two aircraft system hydraulic pumps 34 are shown mechanically coupled to the accessory gearbox 32. The aircraft system hydraulic pumps 34 are driven by the low pressure shaft via the accessory gearbox 32 and pump hydraulic fluid for use in actuation of the aircraft landing gear, flaps and control surfaces.

Turning to the cabin blower system 30 itself, there is provided a hydraulic circuit 36 comprising a first hydraulic device 38 and a second hydraulic device 40 connected by circuit conduiting 42. The first 38 and second 40 hydraulic devices are both digital displacement pumps capable of acting both as hydraulic pumps (using mechanical inlet drive to pump a hydraulic fluid around the hydraulic circuit) and as hydraulic motors (extracting kinetic energy from the hydraulic fluid and converting it to rotational mechanical motion). The circuit conduiting 42 connects the first hydraulic device 38 to the rest of the hydraulic circuit 36 at first 44 and second 46 ports of the first hydraulic device 38. The circuit conduiting 42 connects the second hydraulic device 40 to the rest of the hydraulic circuit 36 at inlet 48 and outlet 50 ports of the second hydraulic device 40.

The second hydraulic device 40 is mechanically coupled to the accessory gearbox 32 in a driving relationship, and thereby indirectly to the low pressure shaft of the gas turbine engine. The first hydraulic device 38 is mechanically coupled to a cabin blower compressor 52 provided on the aircraft via an epicyclic gearbox 54. The epicyclic gearbox 54 is serviced with engine oil by an engine oil circuit 56 comprising an engine oil pump 58 which is driven via a mechanical connection to the accessory gearbox 32. Additionally the high pressure spool is mechanically coupled to the accessory gearbox 32 via a clutched linkage 93 capable under the influence of the EEC of selectively decoupling the high pressure spool and accessory gearbox 32.

The cabin blower compressor 52 is disposed in a duct system (not shown) connecting a scoop (not shown) on an outer wall of a bypass duct (not shown) of the gas turbine engine and aircraft cabin air conditioning outlets (not shown). Between the cabin blower compressor 52 and the air conditioning outlets in the duct system is a starter air shut off valve assembly (not shown). The shut-off valve assembly is arranged to be operable to alternatively allow one of two conditions. In a first condition the shut-off valve assembly permits the flow of air from the cabin blower compressor 52 towards the air conditioning outlets and seals communication between the duct system and a starter conduit (not shown). The starter conduit connects the duct system at the location of the shut-off valve assembly and a port to atmosphere. In a second condition the shut-off valve assembly permits flow from the starter conduit towards the cabin blower compressor 52 and prevents flow towards the air conditioning outlets.

Immediately adjacent and upstream of the cabin blower compressor 52 (between the cabin blower compressor and the scoop) are an array of variable inlet guide vanes 60. Immediately adjacent and downstream of the cabin blower compressor 52 (between the cabin blower compressor and the air conditioning outlets) are an array of variable exit guide vanes 62.

A valve assembly 64 is provided between the first 38 and second 40 hydraulic devices in the hydraulic circuit 36. The valve assembly 64 is actuatable between a first position and a second position. In the first position, as shown in FIG. 2, a first pair of valve assembly ports in the valve assembly 64 are aligned with the conduiting 42, one port connecting conduiting leading to the outlet port 50 and first port 44 and the other port connecting conduiting leading to the inlet port 48 and second port 46. When in its first position the valve assembly 64 therefore forms the hydraulic circuit 36 into a loop. In the second position when the valve assembly 64 is actuated to move downward as shown in FIG. 2, a second pair of valve assembly ports in the valve assembly 64 are aligned with the conduiting 42, one port connecting conduiting leading to the outlet port 50 and second port 46 and the other port connecting conduiting leading to the inlet port 48 and first port 44. When in its second position the valve assembly 64 therefore forms the hydraulic circuit 36 into a figure of eight. As will be appreciated, with the valve assembly 64 in its different positions, the hydraulic fluid will flow through the first hydraulic device 38 in opposite directions. Control over actuation of the valve assembly 64 between its first and second positions is exercised by a processor (in this case an electronic engine control (EEC) 66 of the gas turbine engine) under the influence of an aircraft control system 68. The valve assembly 64 is also provided with throttling functionality allowing the EEC 66 to control the flow rate of the hydraulic fluid through its ports.

A hydraulic accumulator 70 is provided in the hydraulic circuit 36 connected by the conduiting 42. In use the hydraulic accumulator 70 is partially filled with hydraulic fluid and partially filled with a compressible gas. The hydraulic circuit 36 further comprises a heat exchanger 72 through which the hydraulic fluid in the hydraulic circuit 36 passes and is brought into heat exchange relationship with air passing through a bypass duct of the gas turbine engine.

In use the cabin blower system 30 has both a cabin blower configuration (which may be considered a forward configuration) and an engine start configuration (which may be considered a reverse configuration). The cabin blower configuration allows the system 30 to perform as a cabin blower while the engine start configuration allows it to perform as part of a starter system for the gas turbine engine.

When it is desired for the cabin blower compressor 52 to provide compressed air to an aircraft environmental control system, the EEC 66 actuates the valve assembly 64 to adopt its first position. The EEC 66 further actuates the starter air shut-off valve assembly (not shown) so as it is in its first condition, and actuates the clutched linkage to decouple the high pressure spool from the accessory gearbox 32.

In the cabin blower configuration the cabin blower compressor 52 is driven by the low pressure spool of the gas turbine engine. This drive is delivered by the closed circuit hydrostatic transmission described above with reference to FIG. 2. Specifically the spool of the gas turbine engine delivers drive to the accessory gearbox 32. The accessory gearbox 32 in turn delivers drive to the aircraft system hydraulic pumps 34 and the engine oil pump 58, which respectively pump hydraulic fluid and engine oil. The accessory gearbox 32 also drives the second hydraulic device 40 causing it to perform as a hydraulic pump. Pumped by the second hydraulic device 40, hydraulic fluid leaves the outlet port 50, passes through the valve assembly 64 and enters the first port 44 of the first hydraulic device 38. Thereafter the hydraulic fluid leaves the first hydraulic device 38 via its second port 46, passes through the valve assembly 64 and returns to the second hydraulic device 40 via its inlet port 48, before recirculating again. As the hydraulic fluid passes through the first hydraulic device 38 it causes it to perform as a hydraulic motor and to drive the cabin blower compressor 52 via the epicyclic gearbox 54. The epicyclic gearbox 54 is lubricated and cooled by the engine oil pumped from the engine oil pump 58.

The cabin blower compressor 52, driven by the low pressure spool of the gas turbine engine, compresses air collected by the scoop and delivered to the compressor via the duct system (not shown). Before and after compression the air is conditioned by the variable inlet guide vanes 60 and variable outlet guide vanes 62 respectively, the orientation of which are controlled by the EEC 66. Once compressed the air is delivered by the duct system for regulated use in the cabin of the aircraft via the air conditioning outlets. The rate at which the cabin blower compressor 52 is driven is controlled via the throttling functionality of the valve assembly 64 under the control of the EEC 66 which responds to demand for cabin air and pressurisation provided by the aircraft control system 68.

When it is desired for the cabin blower compressor 52 to perform as a turbine and rotate the low and high pressure spools of the gas turbine engine for engine start (ground or in-flight), the EEC 66 actuates the valve assembly 64 to adopt its second position. The EEC 66 further actuates the starter air shut-off valve assembly (not shown) so as it is in its second condition and actuates the clutched linkage to couple the accessory gearbox 32 and high pressure spool.

In the engine start configuration the cabin blower compressor 52 drives the low and high pressure spools of the gas turbine engine. This drive is delivered by the closed circuit hydrostatic transmission described above with reference to FIG. 2. Specifically an external source of gas (typically air) is supplied to the cabin blower compressor 52 via the starter conduit (not shown), causing it to perform as a turbine and rotate in an opposite sense by comparison with its rotational direction when it is operating in the cabin blower configuration. Conditioning of the externally sourced gas before and after its interaction with the cabin blower compressor 52 is performed by the variable outlet guide vanes 62 and variable inlet guide vanes 60 respectively under the control of the EEC 66. The rotation of the cabin blower compressor 52 delivers drive to the epicyclic gearbox 54. The epicyclic gearbox 54 in turn delivers drive to the first hydraulic device 38 causing it to perform as a hydraulic pump. Pumped by the first hydraulic device 38, hydraulic fluid leaves the first port 44, passes through the valve assembly 64 and enters the inlet port 48 of the second hydraulic device 40. Thereafter the hydraulic fluid leaves the second hydraulic device 40 via its outlet 50, passes through the valve assembly 64 and returns to the first hydraulic device 38 via second port 46, before recirculating again. As the hydraulic fluid passes through the second hydraulic device 40 it causes it to perform as a hydraulic motor and to drive the accessory gearbox 32, which in turn drives the low and high pressure spool of the gas turbine engine.

With the low and high pressure spools driven by the cabin blower compressor, sufficient airflow may be provided to a combustor of the gas turbine engine for engine light-up. In order to improve conditions for engine start, the valve assembly 64 may be used to adjust the rate of hydraulic fluid flow in the hydraulic circuit 36 and thereby the rate of rotation of the spools.

Regardless of whether the hydraulic circuit 36 is operating in the cabin blower or engine start configurations, the accumulator 70 operates to reduce fluctuations in hydraulic fluid pressure. Similarly the heat exchanger 72 operates to maintain the hydraulic fluid temperature within desired limits regardless of system operating configuration.

For simplicity, with respect to the embodiment described above, the engine start configuration is discussed in such a way as to principally contemplate a routine engine start (e.g. ground start using a source of external air as might be provided by a suitable compressed air rig). Nonetheless it will be appreciated that the source of external air need not be so limited. Further that in-flight windmill start may also be performed or at least assisted by operating the system in the engine start configuration. It may be for example that in some embodiments the source of external air is provided by a bleed from another running engine and/or an auxiliary power unit of the aircraft and/or another aircraft air system.

It is further noted that whilst the embodiment above describes only a single aircraft cabin blower system, one or more additional such systems may also be provided, and their hydraulic circuits may be selectively or otherwise linked. Additionally or alternatively the hydraulic circuit of the aircraft cabin blower system may be selectively or otherwise linked to a broader hydraulic system 98 of the aircraft used for operation of aircraft systems and components 99. Such linking of systems may allow for enhanced redundancy in terms of cabin blower and/or aircraft hydraulic component operation in the event of one or more engine failures (i.e. an aircraft cabin blower system associated with one engine may be used to provide at least partial operation of another such system and/or a broader aircraft hydraulic system). Additionally such a system may provide enhanced engine start functionality (e.g. using an aircraft cabin blower system associated with one engine to drive one or more shafts of another during an in-flight engine start procedure). Additional components to those described with respect to the embodiment of FIG. 2 may be provided in order to facilitate and control such interlinking of systems. Such components may include additional interlinking and/or bypass conduits which may be valve controlled.

It will be understood that the invention is not limited to the embodiment above-described and various modifications and improvements can be made without departing from the concepts described herein. By way of specific example the epicyclic gearbox could be replaced with a Continuously variable transmission or a sequential shifting gearbox. Except where mutually exclusive, any of the features may be employed separately or in combination with any other features and the disclosure extends to and includes all combinations and sub-combinations of one or more features described herein.

The invention claimed is:

1. An aircraft cabin blower system comprising:
   a cabin blower compressor; and
   a hydraulic circuit including a first hydraulic device, a second hydraulic device, and a valve assembly,
   wherein the first hydraulic device is mechanically coupled to the cabin blower compressor and the second hydraulic device is configured to be mechanically coupled to a spool of a gas turbine engine,
   wherein the aircraft cabin blower system is selectively operable between a cabin blower configuration and an engine start configuration,
   wherein the valve assembly is actuatable between a first position when the system is in the cabin blower configuration and a second position when the system is in the engine start configuration, whereby the first and second positions give rise to different porting of liquid in the hydraulic circuit such that the flow direction through the second hydraulic device is the same regardless of whether the system is operating in the cabin blower configuration or the engine start configuration and such that the flow direction through the first hydraulic device reverses in dependence upon whether the system is operating in the cabin blower configuration or the engine start configuration,
   wherein, in the cabin blower configuration, the first hydraulic device operates as a hydraulic motor and the second hydraulic device operates as a hydraulic pump, such that a driving force received from the spool of the gas turbine causes the second hydraulic device to pump liquid provided in the hydraulic circuit and thereby to drive the first hydraulic device, which in turn rotates the cabin blower compressor, and
   wherein, in the engine start configuration, the first hydraulic device operates as a hydraulic pump and the second hydraulic device operates as a hydraulic motor such that a driving force supplied by the cabin blower compressor acting as a turbine causes the first hydraulic device to pump the liquid provided in the hydraulic circuit and thereby to drive the second hydraulic device, which in turn is configured to rotate the spool of the gas turbine engine.

2. The aircraft cabin blower system according to claim 1, wherein at least one of the valve assembly, the first hydraulic device, and the second hydraulic device is controllable to vary the liquid flow rate through the hydraulic circuit.

3. The aircraft cabin blower system according to claim 1, wherein the spool of the gas turbine engine is a low pressure spool, and
   wherein the system is configured to be selectively coupleable in a driving relationship to a high pressure spool of the gas turbine engine so as to be engaged when the system is in the engine start configuration.

4. The aircraft cabin blower system according to claim 1, wherein, in the engine start configuration, the cabin blower compressor is configured to be driven by an external gas supply, the cabin blower compressor thereby acting as a turbine.

5. The aircraft cabin blower system according to claim 1, wherein, in the cabin blower configuration, the cabin blower compressor is configured to pump air taken from a bypass duct of the gas turbine engine.

6. The aircraft cabin blower system according to claim 1, further comprising a cabin blower gearbox via which the mechanical coupling between the first hydraulic device and the cabin blower compressor is made.

7. The aircraft cabin blower system according to claim 1, wherein the second hydraulic device is configured to be mechanically coupled to an accessory gearbox of the gas turbine engine via which the mechanical coupling to the spool of the gas turbine engine is configured to be made.

8. The aircraft cabin blower system according to claim 1, wherein at least one of the first and second hydraulic devices is a digital displacement device.

9. An aircraft comprising the cabin blower compressor system in accordance with claim 1.

10. The aircraft according to claim 9, wherein the hydraulic circuit is part of and is in fluid communication with an aircraft hydraulic circuit comprising additional hydraulically controlled components.

11. A method of operating a cabin blower system to supply gas to an aircraft cabin comprising:
    providing the aircraft cabin blower system of claim 1; and
    using drive provided by the gas turbine engine to pump the hydraulic liquid and using flow of the hydraulic liquid to drive rotation of the cabin blower compressor.

12. The method according to claim 11, wherein the spool of the gas turbine engine is mechanically coupled to a second hydraulic circuit.

13. A method of operating a cabin blower system to rotate a spool of a gas turbine engine during start of the gas turbine engine comprising:
    providing the aircraft cabin blower system of claim 1; and
    using drive provided by the cabin blower compressor acting as a turbine to pump the hydraulic liquid and using flow of the hydraulic liquid to drive rotation of the spool.

14. A method according to claim 13, wherein the spool of the gas turbine engine is mechanically coupled to a second hydraulic circuit.

* * * * *